United States Patent [19]

Pace et al.

[11] Patent Number: 5,250,850
[45] Date of Patent: Oct. 5, 1993

[54] AUTOMOTIVE LIGHT AND WIPER CONTROL CIRCUIT

[76] Inventors: Albert Pace; William R. Neuhaus; Alan S. Lipman, all of c/o 1 South St., Washingtonville, N.Y. 10992

[21] Appl. No.: 640,810
[22] Filed: Jan. 14, 1991
[51] Int. Cl.⁵ .......................... B60L 1/14; B60Q 1/02
[52] U.S. Cl. ..................... 307/10.8; 315/82
[58] Field of Search .............. 307/10.1, 10.8; 315/77, 315/82, 83; 361/173, 175

[56] References Cited

U.S. PATENT DOCUMENTS

| | | | |
|---|---|---|---|
| 3,767,966 | 10/1973 | Bell | 315/82 |
| 3,879,617 | 4/1975 | Faller | 307/10.8 |
| 4,015,137 | 3/1977 | Kniesly et al. | 315/82 |
| 4,097,839 | 6/1978 | Lesiak | 307/10.8 |
| 4,236,099 | 11/1980 | Rosenblum | 315/83 |
| 4,956,562 | 9/1990 | Benedict et al. | 307/10.8 |

Primary Examiner—A. D. Pellinen
Assistant Examiner—Richard T. Elms

[57] ABSTRACT

A circuit for coupling the operation of the headlights and parking lights of an automobile to the operation of the windshield wipers consists of a first switch controlled by the presence of wiper motor voltage. The switch is in parallel with the headlights switch to effect operation of the headlights. A latch provides for the continuous operation of the switch in the event of loss of wiper motor voltage, such as when the wipers are operated in a pulsed mode. A second switch, controlled by operation of the first, operates the parking lights. The circuit includes elements to release the latch to disengage the first and second switches to turn the lights off when the wiper motor is turned off, and preferably includes the parking lights switch as a part thereof.

3 Claims, 1 Drawing Sheet

AUTOMOTIVE LIGHT AND WIPER CONTROL CIRCUIT

The present invention relates to an electrical circuit and in particular to an electrical circuit intended to control the operation of automobile headlights, parking lights in conjunction with the operation of the windshield wiper motor.

BACKGROUND OF THE INVENTION

It is well recognized that the visibility of the driver of an automobile can be substantially lessened in inclement weather conditions. In rain or snow it becomes more difficult for the driver to have an unimpaired view of the road, even with the automobile's windshield wiper system engaged.

In order to provide an increased margin of safety for drivers in inclement weather conditions, legislation is pending or is in effect in various jurisdictions, which requires a driver to engage the car headlights whenever the windshield wipers are used. When illuminated, the headlights and taillights provide extra notice to other vehicles of the presence of the auto.

Typical automotive electrical systems provide two independent electrical circuits for the lights and windshield wiper systems. Accordingly, the driver must remember to turn on the lights whenever the windshield wipers are used. In addition, the driver must remember to turn off the lights when the wipers are disengaged. This is especially important during daylight driving, when the mere engagement of the headlights and taillights may be insufficient notice to the driver that they are on.

There have been several attempts to provide circuitry that will provide a coupling between the wiper and lighting circuits to insure compliance with the above legislation. Such circuits suffer from a variety of shortcomings, such as complexity, interaction with the normal operation of the light systems and the inability to be reset easily.

It is accordingly a purpose of the present invention to provide a wiper-headlights coupling system which may be easily utilized in conjunction with conventional automotive wiper and light systems.

Another purpose of the present invention is to provide a system in which the lights remain energized during intermittent operation of the windshield wipers.

Yet another purpose of the present invention is to provide a system which may be easily and efficiently de-energized when use of the wipers is halted.

BRIEF DESCRIPTION OF THE INVENTION

In accordance with the above and other and additional purposes and objects, the present invention comprises a circuit which may be utilized in conjunction with the independent wiper and light switches and circuits found in conventional automobiles. The circuit activates the headlights or parking lights when the wiper motor is activated, either intermittently, such as in the pulse or "mist" mode, or continuously. After the wipers are disengaged, the lights may be disengaged by a momentary activation of the parking lights switch. The lights are also disengaged when the ignition switch is turned off. The lights remain operable in the normal manner.

Auxiliary switch means are connected in parallel with the main headlight switch, and are controlled by the presence of the drive voltage on the wiper motor line. Preferably, the switch means are in the form of a relay, the switch contacts of which are in parallel with the light switch and the coil being energized by the wiper drive voltage signal. Latch means are coupled to the auxiliary switch means to maintain the switch means in the closed position despite intermittent presence of the voltage on the wiper motor line.

The auxiliary switch means is also coupled to second auxiliary switch means, preferably a relay, which activates the parking lights. The original parking lights switch is utilized both to provide a parallel path for energization of the rely as well as to release the latch means which maintains the auxiliary switches in the closed position, and thus the lights on, irrespective of the instantaneous voltage condition of the wiper motor line. Thus the momentary activation of the parking lights switch disengages the auxiliary switches, turning off the headlights and allowing the parking lights to be extinguished when the parking lights switch id disengaged. The auxiliary switch means are also disengaged when the car ignition switch is turned off, preventing inadvertent maintenance of the lights due to the coupling system.

BRIEF DESCRIPTION OF THE DRAWINGS

A fuller understanding of the present invention will be achieved upon consideration of the following detailed description of a preferred but nonetheless illustrative embodiment of the invention, when reviewed in consideration with the annexed drawings, wherein.

DETAILED DESCRIPTION OF A PREFERRED EMBODIMENT

Figure 1:
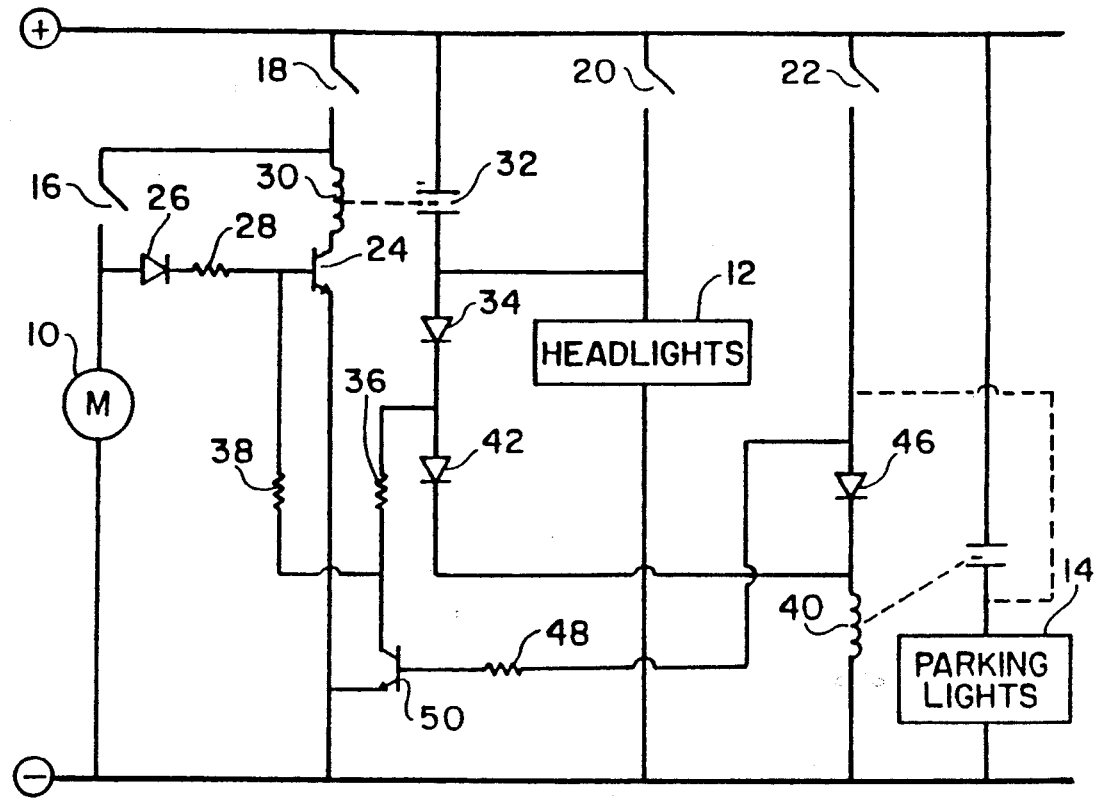
FIG. 1 is a schematic diagram of the circuit of the present invention in a first embodiment wherein there is direct connection between the light switches and the lights.

As depicted in FIG. 1, a typical automotive electrical system includes both a windshield wiper drive motor 10, as well as headlights 12 and parking lights 14 each controlled by an individual switch. Typically, wiper motor switch 16 is connected to the load side of the ignition switch accessory switch portion 18, while the headlights and parking lights switches 20, 22 are connected directly to the car's power supply or battery to allow the lights to be operable independently of the status of the ignition switch. The windshield wiper drive motor is typically provided with appropriate means (not shown) to allow multiple-speed operation, as well as a pulsed or intermittent mode. Both headlight switch 20 and parking lights switch 22 are coupled on their respective second sides to the headlights 12 and parking lights 14. The original connection of the parking lights switch to the battery, which is modified in the present invention, is depicted by a dotted line element in FIG. 1.

In order to couple control of the lights to operation of the wiper motor, an auxiliary switch, activated by the presence of wiper motor potential, is coupled to the headlights. As shown, the base-emitter loop of transistor 24 is connected in parallel with the high side of wiper motor 10 through diode 26 and series resistor 28 such that the transistor is turned on when the motor is energized. Relay coil 30 is in series with the transistor's collector and the high side of the battery through ignition switch accessory portion 18, and thus normally-open relay contacts 32 are closed when the motor is energized. It is to be recognized that a solid-state device may be utilized in place of an electromechanical relay unit.

The contacts 32 are connected in parallel with the headlight switch 20 to energize the headlights in conjunction with wiper motor operation. In addition, contacts 32 also provide a current path, through diode 34 and resistors 36 and 38, to the base of transistor 24, thus providing a latch for the relay coil 30 by maintaining the transistor in the on condition even if wiper motor current is interrupted, as may occur in the wiper pulse mode. This insures that relay coil 30 remains energized and the headlights remain on irrespective of the instantaneous voltage condition on the motor line.

Second relay coil 40 is also coupled to first relay contacts 32 through diode 42, thereby causing the energization of the coil whenever first relay coil 30 is energized. Second relay contacts 44 are connected between the positive voltage supply and the parking lights 14, and thus activate the parking lights simultaneously with the headlights when the wiper motor is energized. Parking lights switch 22, which normally is connected directly between the battery and lights, is disengaged from the lights and is instead coupled to the high side of second relay coil 40 through diode 46. This allows the second relay coil to be energized, turning on the parking lights independently from the headlights, when the parking light switch is engaged. This maintains manual operation of the lights.

The low side of parking lights switch 14 is also coupled through resistor 48 to the base of transistor 50, whose emitter is grounded and whose collector is connected to the node between resistors 36 and 38 which provide the latching current path for transistor 24. When the parking light switch in engaged, the transistor turns on, shorting the node to ground. If first relay contacts 32 are closed because the windshield motor has been energized, transistor 50 shorts the latching current to ground, away from the base of transistor 24, turning the transistor off. In the absence of current from the wiper motor lead the transistor remains off, thus deenergizing first relay coil 30 and shutting off the headlights. Thus a momentary turning on of the parking lights switch 14 basis after the wipers have been turned off shuts off the lights. The system is concurrently reset for subsequent operation.

Figure 2:
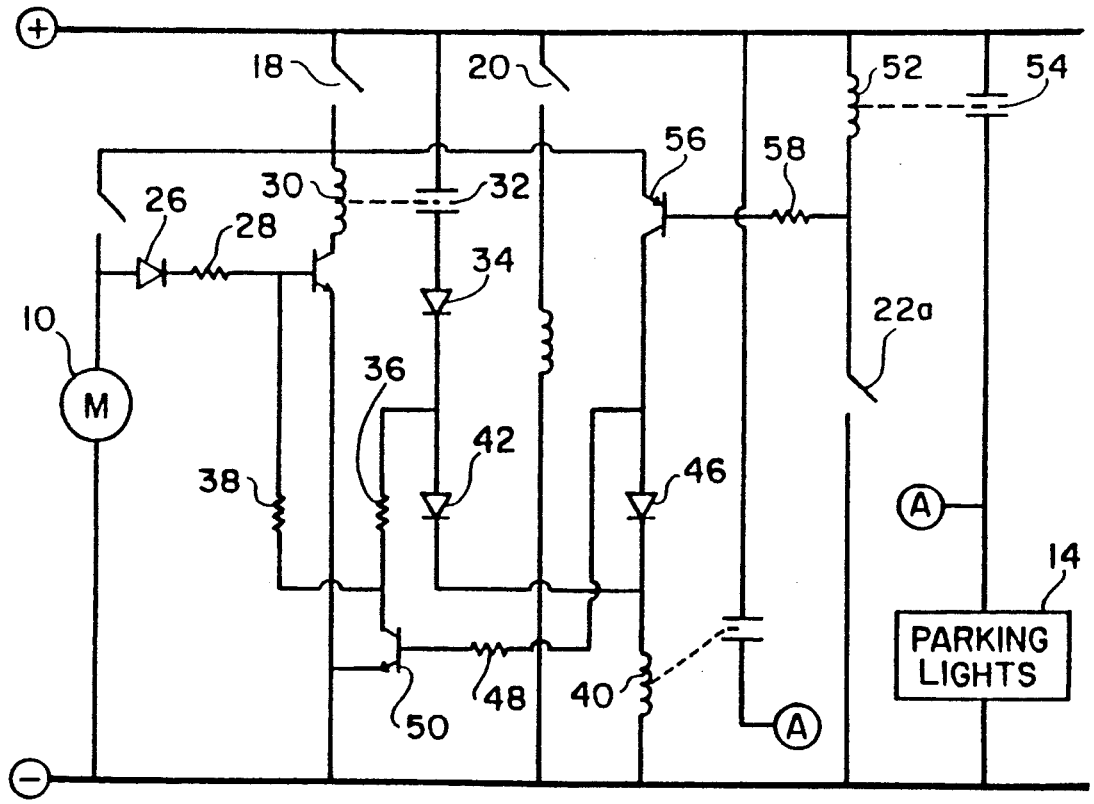
FIG. 2 is a schematic diagram of the circuit of the present invention in an embodiment useful where the lights are indirectly connected to the provided control switches.

Some automobiles use relays to isolate the light circuits from the light switches. The circuit of the present invention utilized in connection with such a system is depicted in FIG. 2. In such a case, parking lights relay 52 provided for isolation purposes is normally activated by the parking lights switch 22a, the parking lights 14 being in series with parking lights relay contacts 54. The isolation relay for the headlights is not shown, it being recognized that the headlights 12 as shown are replaced with a relay coil, the contacts of which are connected between the headlights and the battery.

The emitter of transistor 56 is connected to the battery through main ignition switch 18, while its collector is coupled to the anode of diode 46. The base of the transistor 56 is connected to the node between parking lights relay coil 52 and switch 22a through resistor 58. With the parking lights switch 22a open, reverse bias is applied to the base of transistor 56, keeping it turned off.

When the switch is closed, the base is grounded, allowing current flow through the emitter-base loop and through resistor 48, turning transistor 50 on, shorting latching current from the base of transistor 24 and allowing the system to reset. The remaining portions of the system function as in the previous embodiment.

As presented in the Figures, the resistors may each be 5000 ohms, the diodes silicon diodes such as 4001, while transistors 24 and 50 are appropriate npn switching units, transistor 56 being a similar characteristic pnp unit. The relays are similarly chosen to be operable by the nominal battery voltage of the automobile.

We claim:

1. Apparatus for controlling the operation of automobile headlights and parking lights in conjunction with operation of windshield wipers, comprising:

a transistor serving as a first switch means operable by the presence of a voltage applied to a windshield wiper motor, said switch means coupled to first relay means, a pair of contacts of said first relay means being in parallel with a switch for the automobile headlights; latch means operable by said first switch means to latch said first switch means in a closed position upon first closing of said first switch means; second relay means coupled to said first relay means contacts, a pair of contacts of said second relay means being in series with the automotive parking lights to cause energization thereof upon closure and operable in response to the closing of said first relay means contacts; a transistor serving as a means for decoupling said latch means from said first switch means, said decoupling means further including a parking lights switch of the automobile, said parking lights switch being coupled to said decoupling means transistor whereby said decoupling means transistor is energized to decouple said first switch means from said latch means upon momentary parking lights switch energization and said decoupling means transistor grounds an interconnection between said first switch means and latch means upon energization, whereby said first relay means becomes disengaged in the absence of wiper motor voltage such that said headlights and parking lights are extinguished.

2. Apparatus for controlling the operation of automobile headlights and parking lights in conjunction with operation of windshield wipers, comprising:

a transistor serving as a first switch means operable by the presence of a voltage applied to a windshield wiper motor, said switch means coupled to first relay means, a pair of contacts of said first relay means being in parallel with a switch for the automobile headlights; latch means operable by said first switch means to latch said first switch means in a closed position upon first closing of said first switch means; second relay means coupled to said first relay means contacts, a pair of contacts of said second relay means being in series with the automotive parking lights to cause energization thereof upon closure and operable in response to the closing of said first relay means contacts; a transistor serving as a means for decoupling said latch means from said first switch means, said decoupling means further including a parking lights switch of the automobile, said parking lights switch being coupled to said decoupling means transistor whereby said decoupling means transistor is energized to decouple said first switch means from said latch means upon momentary parking lights switch energization and said decoupling means transistor grounds an interconnection between said first switch means and latch means upon energization, whereby said first relay means becomes disengaged in the absence of wiper motor voltage such that said headlights and parking lights are extinguished, and wherein said parking lights switch is connected in series with a parking lights relay and said decoupling means further comprises a transistor coupled to the interconnection between said parking lights switch and said parking lights relay and to said decoupling means transistor such that said transistor coupled to said parking lights switch and parking lights relay interconnection constitutes a controlled switch energizing said decoupling means transistor upon momentary parking lights switch energization.

3. The apparatus of claim 2 wherein the base of said transistor coupled to said parking lights switch and parking lights relay interconnection is coupled to said interconnection between said parking lights switch and parking lights relay and the collector of said transistor is coupled to said decoupling means transistor.

* * * * *